US006592760B2

(12) United States Patent
Dowdican et al.

(10) Patent No.: US 6,592,760 B2
(45) Date of Patent: Jul. 15, 2003

(54) SPRING AIR LANCE HOSE, AND VERTICAL BASKET CENTRIFUGE INCLUDING SUCH HOSE, AND METHODS OF MAKING AND USING

(75) Inventors: Paul T. Dowdican, Lake Jackson, TX (US); Roy T. Taylor, Lake Jackson, TX (US); Nathan E. Betzen, Hereford, TX (US)

(73) Assignee: Dow Global Technologies Inc., Midland, MI (US)

(*) Notice: Subject to any disclaimer, the term of this patent is extended or adjusted under 35 U.S.C. 154(b) by 0 days.

(21) Appl. No.: 09/978,940

(22) Filed: Oct. 16, 2001

(65) Prior Publication Data

US 2002/0079262 A1 Jun. 27, 2002

Related U.S. Application Data

(60) Provisional application No. 60/240,802, filed on Oct. 16, 2000.

(51) Int. Cl.[7] .......................... B01D 33/46; B01D 33/48; B05B 1/02

(52) U.S. Cl. .................... 210/360.1; 210/372; 210/376; 210/380.1; 210/408; 239/587.4

(58) Field of Search ...................... 210/360.1, 372–374, 210/375, 376, 380.1, 408, 416.1; 134/151, 172; 239/312, 358, 383, 472, 490, 587.4

(56) References Cited

U.S. PATENT DOCUMENTS

| | | | | | |
|---|---|---|---|---|---|
| 2,544,121 | A | | 3/1951 | Wolfe et al. | |
| 2,638,381 | A | * | 5/1953 | Paxton | 261/64.1 |
| 2,640,502 | A | | 6/1953 | Powers | |
| 2,905,194 | A | | 9/1959 | Smith et al. | |
| 3,034,654 | A | * | 5/1962 | Hunt et al. | 210/372 |
| 3,409,137 | A | * | 11/1968 | Schneider | 210/213 |
| 3,416,663 | A | * | 12/1968 | Muller et al. | 210/774 |
| 3,421,702 | A | * | 1/1969 | O'Brien | 239/418 |
| 3,610,289 | A | | 10/1971 | Moss | |
| 3,762,648 | A | * | 10/1973 | Deines et al. | 239/381 |
| 3,844,484 | A | * | 10/1974 | Masai | 239/404 |
| 3,968,777 | A | * | 7/1976 | Franke | 123/44 R |
| 4,394,973 | A | * | 7/1983 | Sauer et al. | 239/467 |
| 4,817,653 | A | * | 4/1989 | Krajicek et al. | 134/168 R |
| 5,713,826 | A | | 2/1998 | West | |
| 6,176,437 | B1 | * | 1/2001 | Pedersen | 239/99 |

FOREIGN PATENT DOCUMENTS

| | | | |
|---|---|---|---|
| EP | 0276416 | * | 8/1988 |

* cited by examiner

*Primary Examiner*—Fred Prince

(57) ABSTRACT

A vertical basket centrifuge utilizing a plow supplemented with a spring air lance hose having a ball and socket joint for affixing the hose to a nozzle, and passages to allow the gas to by pass the ball and socket joint.

16 Claims, 2 Drawing Sheets

SPRING AIR LANCE HOSE, AND VERTICAL BASKET CENTRIFUGE INCLUDING SUCH HOSE, AND METHODS OF MAKING AND USING

CROSS REFERENCE STATEMENT

This application claims the benefit of U.S. Provisional Application No. 60/240,802 filed Oct. 16, 2000.

BACKGROUND OF THE INVENTION

1. Field of the Invention

The present invention relates to separation or filtering, to equipment for separating or filtering, and to methods of making and using separating or filtering equipment. In another aspect, the present invention relates to centrifuging, to centrifuges, and to methods of making and using a centrifuge. In even another aspect, the present invention relates to basket centrifuging, to basket centrifuges, and to methods of making and using basket centrifuges. In still another aspect, the present invention relates to vertical basket centrifuging, to vertical basket centrifuges, and to methods of making and using vertical basket centrifuges. In yet another aspect, the present invention relates to vertical basket centrifuges incorporating an improved air lance hose for removing filtrate from the basket, to such an improved air lance hose, and to methods of making and using such vertical basket centrifuges incorporating such an improved air lance hose.

2. Description of the Related Art

In general, a centrifuge or centrifugal filter comprises a rotary basket or drum which may be rotated at a high speed to centrifugally cast a suspension of particulate material in a liquid phase against a cup-like liner in the rotating basket. The liquid phase is discharged through an opening in the top of the basket, while the solid phase is retained on the liner as a relatively dense layer or cake.

A vertical basket centrifuge is one whose basket or drum rotates about a vertical axis. Centrifuging forces solids against the basket forming a "cake" of the solids.

Upon completion of centrifuging, the cake is then removed utilizing a plow, which may be alternatively described as a knife, scraper, blade, rake, or other such mechanism suitable for removing the cake from the basket. In most instances, the plow is moved radially against the cake, but not so far as to damage the basket. In practice, the plow will be moved to within some fraction of an inch from the basket, for example, to within ½", ¼", ⅛", 1/16", 1/32", or less, of the basket. Since the plow is not intended to be operated in contact with the basket, this means, that even after application of the plow, there is always some small amount of the cake still remaining on the basket. Generally, it is removed by gas of a suitable velocity to dislodge this remaining cake. Conveniently, a gas nozzle is mounted on the plow, and may be operated simultaneously with the contacting of the plow, or sequentially before and/or after contacting of the plow. A tubing connects this plow mounted gas nozzle to a gas manifold.

As the plow is moved into and out of contact with the cake, the tubing must be somewhat flexible and allow for a certain amount of repeatability.

U.S. Pat. No. 2,544,121, issued Mar. 6, 1951 to Wolfe et al., discloses a hose coiling device, particularly adapted for use on a gasoline dispensing pump.

U.S. Pat. No. 2,640,502, issued Jun. 2, 1953, to Powers, discloses a hose insert for preventing kinking of hose, such as pneumatic and garden hose, and in particular a hose having a continuous spring wire extended throughout the length thereof for preventing sharp bending and kinking.

U.S. Pat. No. 2,905,194, issued Sep. 22, 1959 to Smith et al., discloses a combination air hose and tool balancer, designed to balance a tool at a predetermined height above a work area while still permitting the tool to be pulled down to the work by the operator.

U.S. Pat. No. 3,610,289, issued Oct. 5, 1971 to Moss, discloses an air line fitted with internal coil springs for use with articulated vehicles. The line consists of a helically coiled tube of thermoplastics material in which metal coil springs extend partially along the air line from each end. The coil springs are normally variable rate springs, for example, tapered over their inner end portions, in order to prevent weakness developing in the tube at the inner ends of the springs.

U.S. Pat. No. 5,713,826, issued Feb. 3, 1998 to West, discloses a vertical basket centrifuge with feed acceleration and a removable liner. The centrifuge includes a rotary basket with a bottom wall, side wall and a top wall with a central opening therein includes a liquid feed pipe extending into the basket through the top opening to a point spaced above the basket bottom wall at the rotary axis thereof for conducting a feed liquid into the basket. A feed accelerator projects from the basket bottom wall opposite the feed pipe, and rotates with the basket so that, the accelerator will impart radial and angular acceleration to the liquid issuing from the feed pipe so that liquid is redirected and accelerated toward the basket side wall. The centrifuge further includes a liquid drain in the basket bottom wall adjacent to the rotary axis of the basket for draining liquid from the basket when the rotation of the basket is stopped.

However, in spite of these advancements in the prior art, none of these prior art references disclose or suggest, a vertical basket centrifuge having a gas hose with by pass holes in the fitting, and a ball and socket joint for connection of the hose nozzle to the plow.

Thus, there is still a need for centrifuging, a vertical basket centrifuge, and methods of making and using the centrifuge.

There is another need in the art for a vertical basket centrifuge having a gas hose with by pass holes in the fitting, and a ball and socket joint for connection of the hose nozzle to the plow, and methods of making and using such centrifuge.

These and other needs in the art will become apparent to those of skill in the art upon review of this specification, including its drawings and claims.

SUMMARY OF THE INVENTION

It is an object of the present invention to provide for centrifuging, a vertical basket centrifuge, and methods of making and using the centrifuge.

It is another object of the present invention to provided for a vertical basket centrifuge having a gas hose with by pass holes in the fitting, and a ball and socket joint for connection of the hose nozzle to the plow, and methods of making and using such centrifuge.

These and other objects of the present invention will become apparent to those of skill in the art upon review of this specification, including its drawings and claims.

According to one embodiment of the present invention, there is provided a vertical basket centrifuge. The centrifuge includes a frame, a rotatable basket, supported by the frame and rotatable relative to the frame, and a plow supported by the frame, and movable into and out of close proximity with the basket. The centrifuge also includes a nozzle supported by the plow, the nozzle rotatably affixed to a tubing by a rotatable joint, the nozzle having passages to allow any gas flowing through the tubing to the nozzle to by pass the joint. Further embodiments include making and using this vertical basket centrifuge.

According to another embodiment of the present invention, there is provided a vertical basket centrifuge plow assembly. The assembly includes a plow movable into and out of close proximity with a basket of a vertical basket centrifuge, and further includes a nozzle supported by the plow, the nozzle rotatably affixed to a tubing by a rotatable joint, the nozzle having passages to allow any gas flowing through the tubing to the nozzle to by pass the joint. Further embodiments include making and using this assembly.

According to even another embodiment of the present invention, there is provided a tubing and nozzle assembly comprising a nozzle rotatably affixed to a tubing by a rotatable joint, the nozzle having passages to allow any gas flowing through the tubing to the nozzle to by pass the joint. Further embodiments include making and using this assembly.

DETAILED DESCRIPTION OF THE INVENTION

Figure 1:
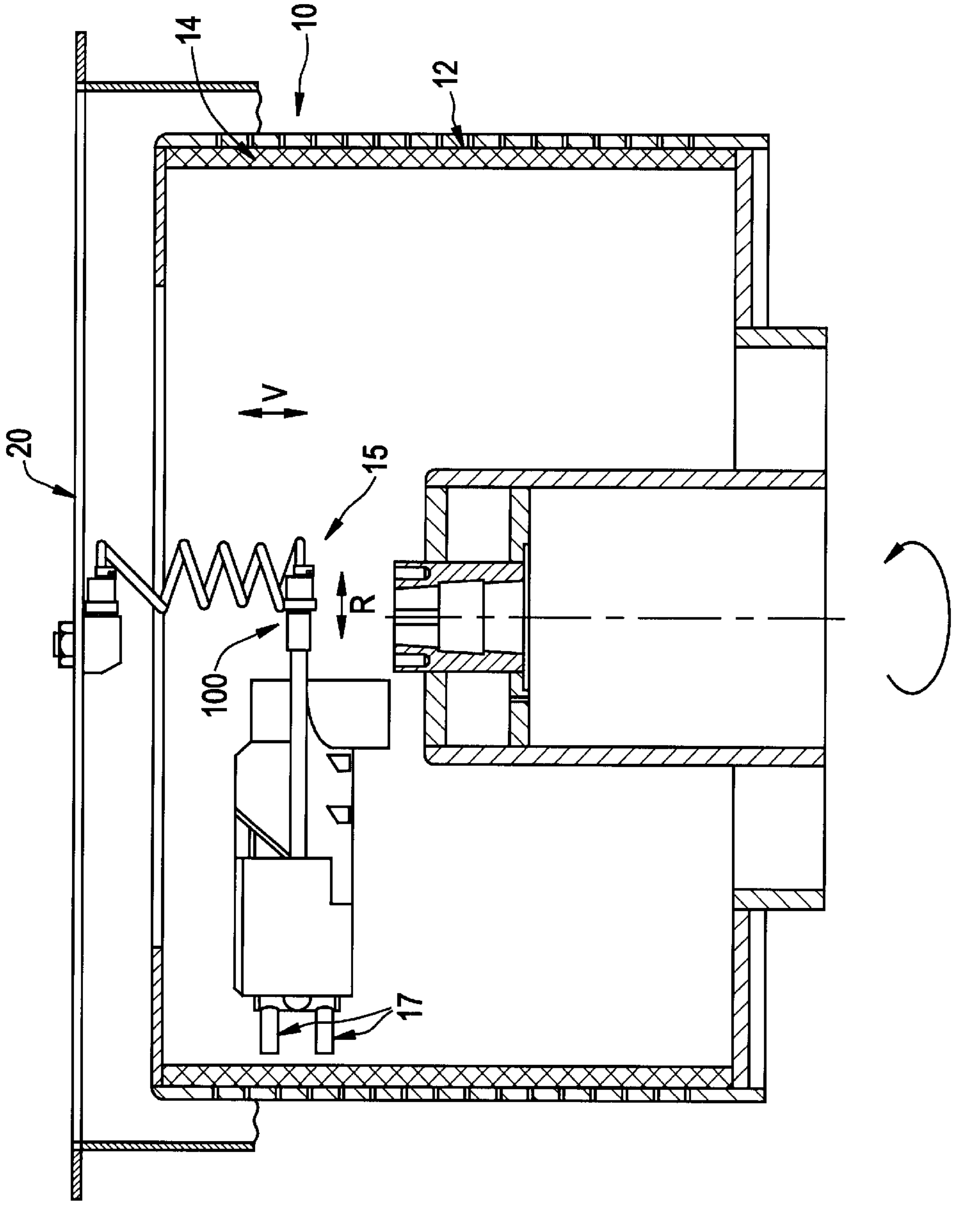
FIG. 1 is a schematic cross-sectional view of a vertical basket centrifuge 10, showing frame 20, rotatable basket 12 rotatable about axis of rotation $A_r$ as indicated by arrow R, cake 14 accumulated against basket 12, plow 15 movable in the radial and vertical directions shown respectively by arrows R and V, and spring air lance hose 100 mounted to plow 15.

The present invention will now be described by reference to the drawings. Referring to FIG. 1 there is shown a schematic cross-sectional view of a vertical basket centrifuge 10, showing rotatable basket 12 rotatable about axis of rotation Ar, cake 14 accumulated against basket 12, plow 15 movable in the radial and vertical directions shown respectively by arrows R and V and having nozzles 17, and spring air lance hose 100 mounted to plow 15.

In operation, a slurry to be centrifuged is provided to rotating basket 12, with the slurry solids accumulating against basket 12 to form cake 14. A plow 15 is then moved in vertical direction V and/or radial direction R with nozzles 17 brought into contact with cake 14, thereby removing some and/or most of cake 14 from basket 12. As is known in the art, plow 15 may be manually operated, or have automatic mechanism which is either present to sweep basket 12 in a predetermined fashion, or otherwise programmable to sweep as desired.

Air through spring air lance hose 100 may be provided to nozzles 17 to supplement and/or replace the physical contact of plow 15 with cake 14.

Figure 2:
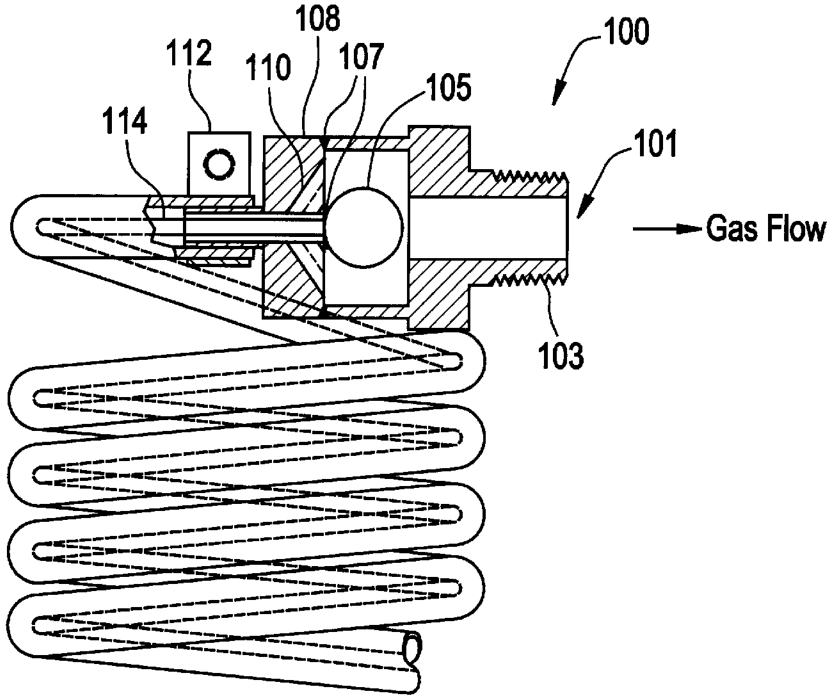
FIGS. 2 and 3 are illustrations of another embodiment of spring air lance hose 100, showing nozzle 101 rotated between a first and second position, respectively, and further showing plastic tubing 102, fitting piece 103, pivot ball 105, weld 107, fitting piece 108, gas by pass hole 110, clamp 112, spring 114, and cap screw 116.
Figure 3:
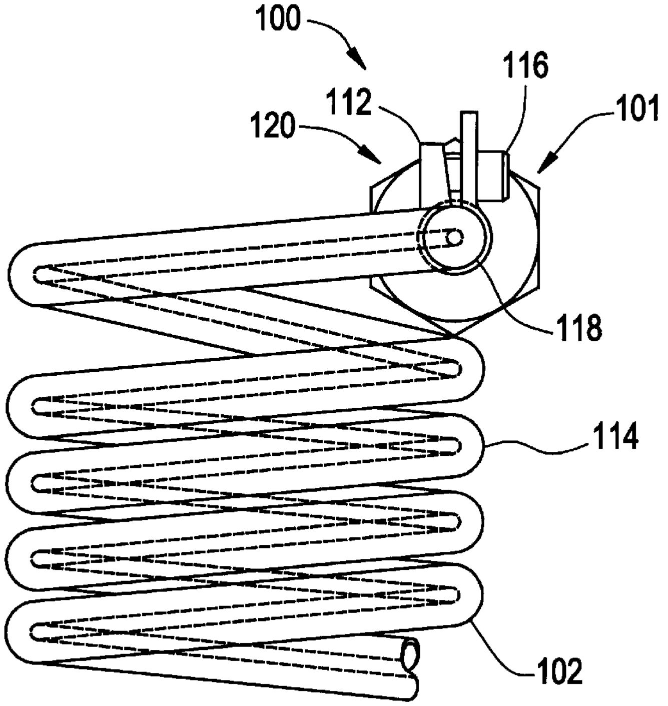

Referring additionally to FIGS. 2 and 3, there are shown additional embodiments of spring air lance hose 100, respectively showing nozzle 101 rotated 90° between a first and second position. Further shown are plastic tubing 102, fitting piece 103, pivot ball 105, weld 107, fitting piece 108, gas by pass hole 110, clamp 112, spring 114, and cap screw 116.

Tubing 102 will be subject to repeatable moving, stretching, and other manipulation as plow 15 is actuated vertically and radially, and should preferably cold flow under stress. Tubing 102 may also be subject to a wide range of chemical environments, and should be selected of suitable material depending upon the chemical environment. Thus, tubing 102 is preferably a resilient material such as commercially available TEFLON brand of fluorinated resin tubing, which cold flows under low stress, but provides the needed chemical resistance.

Spring 114 serves to urge tubing 102 back to its original dimensions when plow 15 is retracted back to its resting position. Pivot ball 105 allows nozzle 101 and tubing 102 to be movable relative to each other. Any suitable attachment mechanism, such as a flexible C clamp 112 may be used to secure and seal tubing 102 to nipple joint 118 of pivot block 120.

According to one method embodiment of the present invention, gas is transported from the case manifold (not shown) through the first rotary fitting, through tubing 102, through the second rotary joint, and to be discharged through nozzle 101. One or more gas passages may be provided in the fitting sub assembly to allow gas to by pass pivot ball 105. Additionally, specially designed gas passages.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A vertical basket centrifuge comprising:

a frame;

a rotatable basket, supported by the frame and rotatable relative to the frame;

a plow supported by the frame, and movable into and out of close proximity with the basket;

a nozzle supported by the plow, the nozzle rotatably affixed to a tubing by a rotatable joint, the nozzle having passages to allow at least a portion of any gas flowing through the tubing to the nozzle to by pass the joint.

2. The centrifuge of claim 1, further comprising gas reservoir affixed to the tubing.

3. The centrifuge of claim 1, wherein the tubing comprises resilient material.

4. The centrifuge of claim 1, wherein the tubing comprises a thermoplastic material.

5. The centrifuge of claim 1, wherein the joint comprises a ball and socket joint.

6. The assembly of claim 5, further comprising a gas reservoir affixed to the tubing.

7. The assembly of claim 5, wherein the tubing comprises a thermoplastic material.

8. The assembly of claim 5, further comprising a gas reservoir connected to the hose, wherein the tubing comprises a thermoplastic material, and wherein the joint comprises a ball and socket joint.

9. The assembly of claim 5, wherein the tubing comprises resilient material.

10. The assembly of claim 9, further comprising a gas reservoir affixed to the tubing.

11. The assembly of claim 9, wherein the tubing comprises a thermoplastic material.

12. The assembly of claim 9, further comprising a gas reservoir connected to the hose, wherein the tubing comprises a thermoplastic material, and wherein the joint comprises a ball and socket joint.

13. The centrifuge of claim 1, further comprising a gas reservoir connected to the hose, wherein the tubing comprises a thermoplastic material, and wherein the joint comprises a ball and socket joint.

14. A vertical basket centrifuge plow assembly comprising:

a plow movable into and out of close proximity with a basket of a vertical basket centrifuge;

a nozzle supported by the plow, the nozzle rotatably affixed to a tubing by a rotatable joint, the nozzle having passages to allow at least a portion of any gas flowing through the tubing to the nozzle to by pass the joint.

15. The assembly of claim 14, wherein the joint comprises a ball and socket joint.

16. The assembly of claim 14, wherein the tubing comprises resilient material.

* * * * *